United States Patent [19]
Egli et al.

[11] 3,932,680
[45] Jan. 13, 1976

[54] PRODUCTION OF STERILE YOGHURT
[75] Inventors: Franz Egli; Franz Egli, both of Lucerne, Switzerland
[73] Assignee: Zentralschweizerischer Milchverband, Lucerne, Switzerland
[22] Filed: Jan. 11, 1974
[21] Appl. No.: 432,657

[30] Foreign Application Priority Data
Sept. 20, 1973 Switzerland.................... 13507/73

[52] U.S. Cl. .................... 426/43; 426/34; 426/409; 426/583; 426/522
[51] Int. Cl.² .......................................... A23C 9/12
[58] Field of Search ......... 426/34, 43, 36, 356, 361, 426/583, 409, 522

[56] References Cited
UNITED STATES PATENTS 3,128,190  4/1964  Donay et al. ......................... 426/43
3,269,842  8/1966  Mayer et al. ......................... 426/43
3,539,363  11/1970 Morgan et al. .................... 426/43 X Primary Examiner—David M. Naff
Attorney, Agent, or Firm—Gordon W. Hueschen

[57] ABSTRACT

Sterile yoghurt is produced by a process wherein milk is pasteurized, homogenized and concentrated 10% by weight, sugar is added, the milk is cooled and acidulated by lactic acid producing bacteria to produce yoghurt, the yoghurt is cooled, stabilizers are added for distribution of proteins, the resultant yoghurt is allowed to stand for a period of time, the yoghurt is filled into containers and sterilized by heating followed by cooling and holding for a period of time and storing at room temperature.

7 Claims, No Drawings

PRODUCTION OF STERILE YOGHURT

BACKGROUND OF THE INVENTION

The present invention relates to a new and improved process for the production of sterile yoghurt, wherein milk is pasteurized and homogenized and, furthermore concentrated by 10% by weight at a temperature of about 92°C, thereafter there is added 10% to 12% by weight sugar, cooled to about 40°C and through the addition of cultures of lactic acid bacteria acidified to a pH-value of 4.0 to 4.3, by incubation over 2½ to 4 hours at a temperature in the range of 42°C to 44°C and after incubation cooled to a temperature in the order of 20°C to 30°C.

The sterile yoghurt produced according to the invention is absolutely free of bacteria or germs and without cooling can be stored up to six months without decomposition occurring or losing its typical taste or the consistency thereof changing. Preferably yoghurt with fruit aromas are produced according to the inventive process, yet the yoghurt can possess other tastes, such as for instance hazel nut aroma.

It is generally known that yoghurt is a product formed of heated milk with specific fermentation promoters, containing a minimum fat content in accordance with the regulated milk, and the dry mass of which can be increased by the vaporization or addition of dried or powder milk or low-fat or skimmed dried milk. Yoghurt is a curdled or acidic milk which is frequently drunk in the Balkan countries, for instance Bulgaria, and which differs from conventional curdled milk due to the nature of the microorganisms. Yoghurt primarily contains Lactobacillus yoghurt, *Lactobacillus bulgaricus* and *Streptococcus thermophilus*, whereas the curdling of the conventional milk is brought about by Bacteria (lactis) aerogenis *Streptococcus lacticus* and the like.

Heretofore known prior art processes for the manufacture of yoghurt are carried out in the following manner The milk from a cow is vaporized until reaching approximately a specific weight of 1.035 (or there is added skimmed dried or powdered milk), then rapidly cooled from a temperature range of about 95°C to 97°C to a temperature range of 42°C to 45°C and there is added thereto 4% to 6% of the above-mentioned bacteria culture. The entire mass or mixture is then maintained for 2 ½ to 3 hours at a temperature of 42°C to 45°C (water bath, cooking vessel, incubator), whereby a portion of the sugar of milk or lactose is transformed by bacteria into lactic acid and some alcohol and there then occurs coagulation or curdling. Finally, the yoghurt is filled into small carefully incubated vessels or containers, stored 1 to 1 ½ hours at room temperature, cooled in a stream of cold water and stored for at least 5 hours at 4°C to 5°C. A process proposed in Czechoslovakia recommends heating to 52° C for 30 minutes and then cooling for a short time to 20°C to 21°C. In this regard attention is invited to the publication "Food Manufacture 1963", page 176. In U.S. Pat. No. 3,025,165, there is obtained from milk where the cream has been skimmed, yoghurt free of butter, which after dispersing of highly unsaturated oils or fats has added thereto in conventional manner yoghurt bacteria. The addition of fruits or other aromatic substances occurs prior to filling into the containers. Yoghurt before it is edible should be at least 12 hours old and at least have been stored for 5 hours at 4°C to 6°C. It is especially recommended for persons suffering from stomach and intestinal problems; its lactic acid is supposed to counteract damaging intestinal bacteria. According to the article of Baumgartel, appearing in the publication "Vitalstoffe" 1959, pages 193–198, the *Escherichia colibacteria* are displaced by the yoghurt, with the result that there is quite markedly intensified the acidophilus bacteria in the intestine; the same effect is attained by acidophilus preparations. The lactic acid content of yoghurt should not be less than 0.8% and should not amount to much more than 1.0%. Each 100 grams yoghurt contains on the average 86.1 grams water, 4.8 grams protein, 3.75 grams fat, 4.5 grams carbohydrate, 0.86 grams mineral substances, 42 mg.Na, 190 mg.K, 150 mg.Ca, 135 mg.P, 0.033 mg.vitamin A, 0.045mg.vitamin $B_1$, 0.24 mg.vitamin $B_2$, and 2 mg.vitamin C.

Yoghurt produced according to conventional processes only can be stored while cooled and transported to a limited extent. Since the yoghurt heretofore known still contains bacteria, in particular *Streptococcus thermophilus*, there also can occur the formation of carbonic acid, apart from the formation of mildew and other decomposition products.

SUMMARY AND DETAILED DESCRIPTION OF THE INVENTION

Hence it is a primary object of the present invention to provide an improved process for the production of yoghurt wherein there is obtained yoghurt which can be maintained without cooling for as much as 6 months and without it losing its characteristic taste.

It was possible to determine that yoghurt, which normally still contains micro-organisms, must be completely free thereof in order that it can be stored over longer periods of time at normal or standard conditions. Of course, after the removal of the remaining bacteria the yoghurt must keep its typical taste and its velvet consistency, that is to say, there should not occur for instance any separation of whey. Also the yoghurt must not contain any preservatives.

The novel and improved process of this development for the production of sterile yoghurt is characterized by the features that prior to the addition of the fruits and/or aromatic substances the yoghurt is cooled to a temperature of at least 25°C, for dissolving or distribution of protein there are added stabilizers at a temperature of less than 12°C, and this mass or mixture is then permitted to stand at this temperature for 5–7 hours, the stabilizers containing hydrocolloids, starches and pectin, thereafter the mass is filled into packages, these packages are hermetically sealed, then sterilized in an autoclave up to 50 minutes at a temperature in a range of 60°C and 85°C and at a pressure up to 2.0 atmospheres, cooled in the autoclave under pressure to a temperature in the order of 10°C to 15°C, then stored for 2–4 days at a temperature of 4°C to 6°C, and finally stored at room temperature.

Generally, the preservation of curdled or acidic milk products by thermal treatment is based upon the principle of the germ killing effects of heat in the acidic range and there are certain measures which are necessary in order to render the acidic casein gel heat-resistant, since such contracts in the presence of heat, with the result that serum is expelled. Hence, one is concerned with preventing this process and it is important to reduce the contraction force and to increase the capillary resistance of the casein gel. Only in this way is it possible to thermally treat curdled or acidic milk products so as to prevent the escape of whey, and to prevent that the casein becomes sandy or mealy.

The following factors influence the reduction of the shrinkage or contraction of the casein when carrying out the inventive process:
1. Lower pH-value of the acidified pre-product.
2. Casein content and sugar content as well as fat content.
3. Cooling of the acidic product prior to heating.
4. Temperature of the thermal treatment.
5. Decomposition of the protein.
6. Stabilizers.
7. Heating temperature of the acidic product.

1. Lower pH-value of the acidified yoghurt

The lower the starting pH-value of the yoghurt that much less problematic is it to carry out the subsequent thermal treatment. The advantage of a markedly acidified yoghurt has two effects: considered from the technological standpoint, the thermal treatment can be carried out much easier in the acidic range the more acidic the starting material, and considered bacteriologically the deadening or killing effect is likewise that much better the more acidic the starting product. The taste sensitivity as well as the digestivity or wholesomeness, however, prevents the products from being too acidic. Therefore, the lower acceptable pH-level is determined by the factors of digestivity or wholesomeness and the acceptable degree of acidity from the standpoint of taste, and thus with the process of the invention the thermal treatment, namely the sterilization, preferably is carried out at a pH-value which is in the order of 3.9 to 4.1.

2. Fat content-casein content-sugar content

The greater the fat content the easier it is to carry out the thermal treatment. The fat has a stabilizing effect with respect to the casein gel and prevents the separation of whey in the final product. The optimum fat content amounts to about 1.5% to 2.5% milk fat.

Converse conditions are present for the casein. The greater the casein content the more difficult it is to thermally process the yoghurt. Particularly favorable to the thermal treatment is the addition of whey powder, however this additive is disadvantageous from the standpoint of the taste sensitivity.

Sugar improves the thermal treatment of yoghurt and the resistance in relation to casein particles is increased by the inclusion of water. It is for this reason that it can be advantageous to heat a part of the sugar contained in the final product already with the starting milk.

3. Cooling of the acidic product prior to thermal treatment

The adherence of water to protein is favored at low temperatures. It is therefore advantageous to cool the acidified yoghurt, prior to further treatment, to a temperature of less than 12°C. Without these measures and notwithstanding the use or presence of hydrocolloids, there can occur the syneresis of whey in the final product.

4. Temperature of the thermal treatment

High temperatures and corresponding heating times of the starting milk favorably influence the thermal treatment of the yoghurt. The whey proteins which are separated at high temperatures have a stabilizing effect with regard to the contraction forces of the casein gel, so that there is possible a two-fold effect in the sense of an improved thermal treatment. Milk, which is intended to be used to produce sterile yoghurt, therefore should always be pasteurized at a temperature of at least 90°C. How long such should be maintained heated at such elevated temperature is extensively dependent upon the pH-value which is required during the thermal treatment of the yoghurt.

An end limit with regard to the degree of heating and the time is indicated when there occur disadvantageous taste and optical effects upon the milk.

5. Decomposition of protein

The thermal treatment of yoghurt is slightly improved microbiologically or enzymatically due to decomposition of protein. That yoghurt, which is intended to be used for the fabrication of sterile yoghurt, should be acidified through the use of an additive of lactobacilli L. casei. There also can be used for this purpose mucous-forming bacteria strains. The effect is to increase the viscosity and to improve the thermal treatment of the yoghurt. During the selection of the cultures there are preferred those whose acidification process can be controlled in a good manner, so that at the end there can be achieved an exact pH-value.

6. Stabilizers

The stabilizers contain hydrocolloids, of which the following are preferred: fruit pectin, pectic acid, alginic acid as well as suitable sodium- and calcium compounds, agar-agar, carageen, guar meal or flour and carob-bean meal flour, further enriched starches and starch meal or powder.

Which hydrocolloid is employed is dependent upon the correct dosage. Especially those hydrocolloids are to be used which do not disadvantageously alter the acidified product with regard to viscosity and appearance. As far as taste is concerned, at the final product there should not be discernible any aftertaste.

For pre-swelling there are preferably employed the hereinafter listed stabilizers and emulsifiers.

7. Heating temperature of the acetic product

According to a particular embodiment of the inventive process, the heating of the stabilized product can be carried out in the following manner:

| Time | Temperature in °C | Pressure |
| --- | --- | --- |
| 0–10 minutes | 60°C to 80°C | about 1.5 atmospheres |
| 10–about 25 minutes | up to about 85°C | 1.6–2.0 |
| about 15 minutes | Cooling down to 15°C | up to standard pressure |

During the conventional production of yoghurt there are also used stabilizers, but such serve for concentrating the milk and not for swelling, as such occurs in the present process of this development. It is to be understood that regarding the swelling, as the same here occurs, there is to be understood that there does not occur any concentration or thickening of the milk, rather the protein contained in the milk is dissolved or distributed. As part of the heretofore used and known stabilizers there belong, among others, also gelatine which ensures that the yoghurt will have imparted thereto a velvet consistency, but gelatine has the drawback that yoghurt treated with the gelatine again becomes more liquid at a temperature of 18°C and more.

The stabilizers required for carrying out the process of this invention and which bring about swelling of the yoghurt are well known in the art, however they were not previously used for swelling, rather for concentrating or thickening the milk. These stabilizers can be divided into three groups, namely the stabilizers A which, for instance, contain an emulsifier (GMS-33 glycerine monostearate), carageen (Satiagel HV ex rot 5270), carboxymethylcellulose (AKU-CMC 4 F 850), carob-bean meal, (Polygum 14 T) and guar meal or powder (Polygum 26 N), the stabilizers B which for instance consist of potato starch or other starches, and finally the stabilizers C, which practically consist of "SuCrest YO - 72" (pure modified plant starch) and "SuCrest YO - 100" (60% modified gelatine and sucrose wherein the sucrose is the carrier). The last mentioned stabilizer can be commercially obtained on the market from the German firm SuCrest WD GmbH, Offenbach, Germany.

Initially there is preferably added to the yoghurt the stabilizer A in a quantity of about 0.2 % by weight, and such is then permitted to stand in order to obtain swelling. Thereafter the stabilizer B can be added in the same amount, and preferably such is permitted to stand for further swelling at temperatures less than 12°C, and finally there can be added to the yoghurt mass the stabilizer C in a quantity of about 0.4 to 0.5 % by weight.

In the event that the pH-value of the yoghurt, after incubation is too low, then prior to or after the addition of the stabilizers such can be corrected by the addition of a mixture which, for instance, consists of disodium phosphate and sodium citrate. Generally, however, correction of the pH-value should only be about 0.1.

After the possibly undertaken pH-correction, there is usually admixed to the treated yoghurt mass the fruit or aroma substances. There is also the possibility of adding some sugar in the event that the taste of the obtained yoghurt is too acidic, however the greatest amount of sugar should be added to the milk after concentration.

As a general rule the fabricated aromatized yoghurt should be permitted to stand for about 24 hours at temperatures less than 8°C and then filled into containers which are hermetically sealed, such as for instance cans formed of tin plate, which are internally provided with a protective coating or lacquer, or also aluminum cans with an internal lacquer coating.

After completion of sterilization in an autoclave the finished sterile yoghurt can be checked in the following manner:

During storage for one week at 25°C, there must not occur any syneresis or swelling. Furthermore, for the bacteriological control of sterile yoghurt, there are applicable more stringent requirements than usual. The proof is primarily related to yeast and mold as well as spores (clostridium). Setting-up of durability samples:

10 – 15 days at 30°C – 37°C
5 days at 50°C (for detection of clostridium)
3 months (90 days) at 20°C – 30°C
5 months (120 days) at 15° – 25°C or
8 months (240 days) at 4°C During this storage time there should not be detectable any of the above-mentioned germs or spores.

In the Example given hereinafter there is described a preferred exemplary embodiment of the inventive process.

EXAMPLE 100 liters of full-cream milk are continuously pasteurized at 92°C – 93°C, pre-heated at a temperature of about 65°C and homogenized at a pressure of about 160 atmospheres. These three operations also can be carried out in a different sequence, depending upon the employed equipment. Thus, the milk can be pre-heated to 65°C, homogenized at a pressure of 160 atmospheres and then continuously pasteurized. The milk prepared in this manner is then concentrated 10% by weight by evaporation or vaporization at a temperature up to 92°C. Thereafter the milk is introduced into a further apparatus and there is added 10% by weight sugar to the concentrated or thickened milk. The mass is cooled to about 42°C and there is added 2,5 % to 3.5% by weight of a yoghurt culture to the thus obtained milk (the amount of the added yoghurt culture depends upon the composition of the employed full-cream milk). The incubation with the yoghurt culture takes place for 2 ½ to 4 hours, the temperature amounting to about 42°C to 44°C. Incubation must occur as a general rule for such length of time until there is reached a pH-value of 4.2 to 4.3. Then the mass is cooled to a temperature of about 24°C – 25°C, thereafter there are added the stabilizers. There are employed the following stabilizers:

STABILIZER A

20 – 30 % by weight emulsifier (GMS - 33 glycerin monostearate
30 – 40 % by weight carageen (Satiagel HV ex rot 5270)
30 – 40 % by weight carboxymethylcellulose (AKU - CMC 4 F 850)
2 – 3 % by weight carob-bean meal or powder (Polygum 14 T)
4 – 8 % by weight guar meal or powder (Polygum 26 N)

STABILIZER B

Potato starch

STABILIZER C

75 – 85 % by weight SuCrest YO - 72 (pure modified plant starch)
15 – 25 % by weight SuCrest YO - 100 (60 percent modified gelatin and sucrose wherein the sucrose is the carrier)

Of these stabilizers 200 grams of the stabilizer A and 200 grams of the stabilizer B are dissolved in 200 grams water and such is added to the acidulated milk. For swelling is the acidified milk is permitted to stand for about 5 – 7 hours at a temperature of about 4°C, then, independent of the quality of the obtained yoghurt, there is added to the mass up to 450 grams of the stabilizer C. This stabilizer C imparts to the yoghurt a velvety quality. If the pH-value of the yoghurt amounts to less than 4.1, then this value can be corrected by the addition of a mixture consisting of disodium phosphate and sodium citrate. Correction of the pH-value, however, can only take place by 1/10 pH, this correction being carried out prior to the addition of the stabilizers. Thereafter there are admixed with the yoghurt 10% by weight strawberries and such is permitted to stand for about 24 hours at 40°C. Thereafter the mass is hermetically filled into packages or containers formed of aluminum having an inner lacquer coating. These packages now must be sterilized, and the following procedures are carried out: the aluminum cans filled with the yoghurt are heated in an autoclave, such as used in the canned goods industry, initially during a period of 10 minutes at a pressure up to 1.6 atmospheres to a temperature up to 80°C, then there is increased the temperature to 84°C for 12 minutes and the pressure to about 1.8 atmospheres, and thereafter the mass is permitted to cool for 20 to 25 minutes to about 15°C, the cooling being carried out in the last few minutes without the use of pressure. After completion of the sterilization the yoghurt is stored for 3 days at a temperature of 4°C and finally it can be stored at room temperature.

While there is shown and described present preferred embodiments of the invention, it is to be distinctly understood that the invention is not limited thereto, but may be otherwise variously embodied and practiced within the scope of the following claims.

Accordingly, what is claimed is:

1. A method for the production of sterile yoghurt which comprises concentrating pasteurized and homogenized milk by 10% by weight at a temperature of about 92°C in which the pasteurization is effected at a temperature of at least 90°C, thereafter adding 10% – 12% by weight sugar, cooling to about 40°C, adding cultures of lactic acid bacteria and incubating to a pH-value of 4 to 4.3 over 2-½ to 4 hours at 42°C to 44°C after incubation, cooling to 20°C to 30°C, cooling the yoghurt thus produced to a temperature of 4°C to 12°C and adding thereto an effective amount of stabilizer A, which contains by weight 20–30% emulsifier, 30–40% carageen, 30–40% carboxymethylcellulose, 2–3% carob-bean meal or powder, and 4–8% guar meal or powder; stabilizer B, which is potato starch or other starch; and stabilizer C, which contains by weight 75–85% pure modified plant starch and 15–25% of 60% modified gelatin and sucrose wherein the sucrose is the carrier, for the dissolving or distribution of proteins, and permitting the resulting mass to stand at 4°C to 12°C for 5–7 hours, thereafter filling the mass into containers, hermetically sealing the resulting packages, sterilizing the packages in an autoclave at a temperature in the range of 60°C to 85°C and at a pressure up to 2 atmospheres for a time sufficient to sterilize, cooling the packages under pressure to 10°C to 15°C, further storing the packages for 2–4 days at a temperature of 4°C – 6°C, and finally storing the packages at room temperature.

2. The method as defined in claim 1, wherein the pH-value during sterilization amounts to less than 4.2.

3. The method as defined in claim 1, wherein after the addition of the stabilizers, the temperature at which the mass is permitted to stand is 4°C to 8°C.

4. The method as defined in claim 1, including the step of correcting the pH-value of the mass which is less than 4.1 through the addition of a predetermined quantity of disodium phosphate and sodium citrate.

5. The method as defined in claim 4, wherein the disodium phosphate and sodium citrate is added after the addition of the stabilizers.

6. The process as defined in claim 4, wherein the disodium phosphate and sodium citrate is added prior to the addition of the stabilizers.

7. The method of claim 1, in which stabilizers A and B are added in a quantity of about 0.2% by weight, and then stabilizer C in a quantity of about 0.4% to 0.5% by weight.

* * * * *